Oct. 20, 1942.   R. R. COLBURN   2,299,565
PNEUMATIC FEEDER
Filed Feb. 2, 1942   2 Sheets-Sheet 2

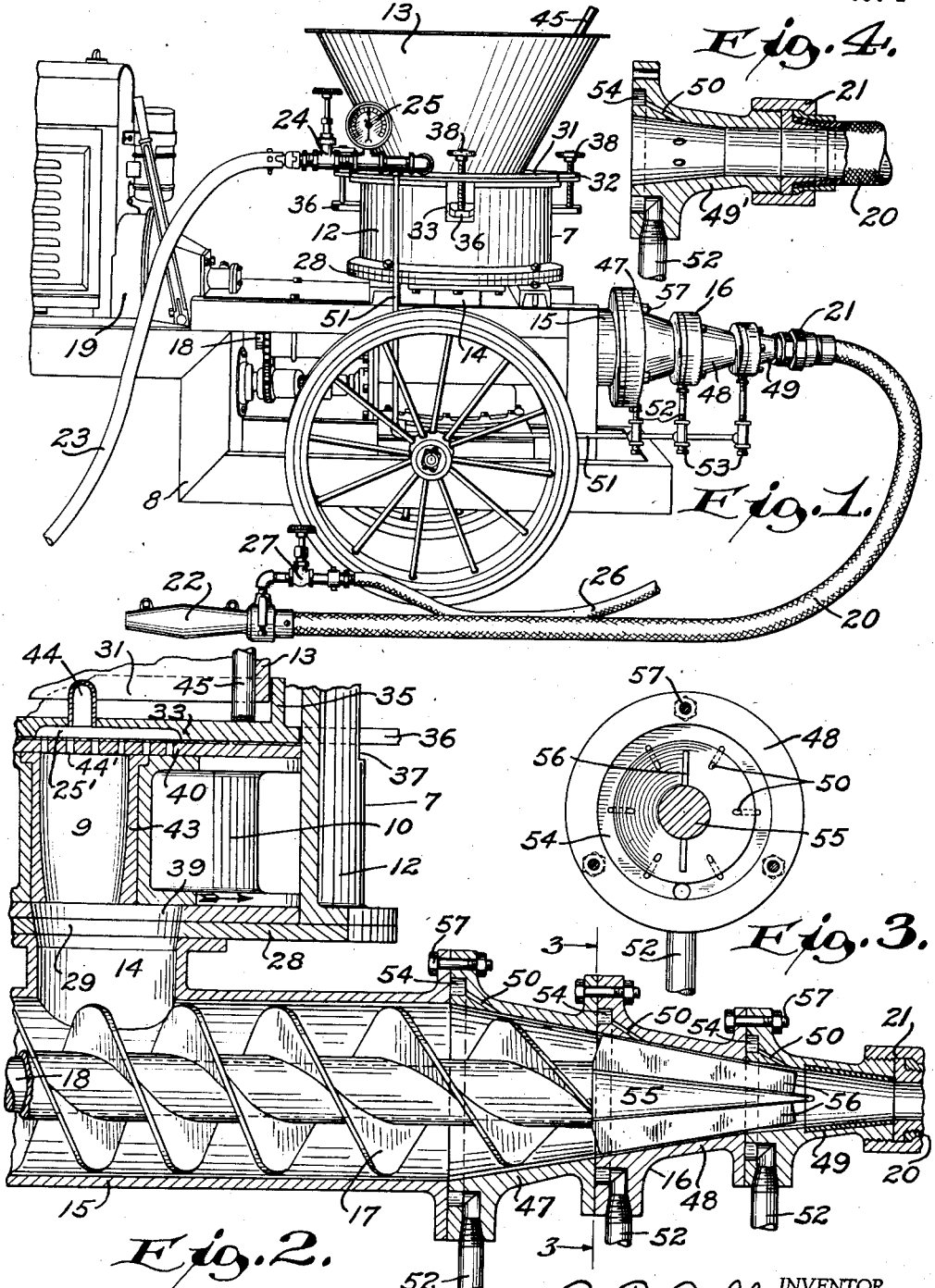

INVENTOR.
R. R. Colburn
BY Lieber & Lieber ATTORNEYS.

Patented Oct. 20, 1942

2,299,565

UNITED STATES PATENT OFFICE 2,299,565

PNEUMATIC FEEDER

Richard R. Colburn, Kansas City, Mo.

Application February 2, 1942, Serial No. 429,245

12 Claims. (Cl. 259—151)

The present invention relates in general to improvements in the art of feeding and transporting materials pneumatically, and relates more specifically to various improvements in the construction and operation of apparatus for continuously transferring relatively dry and finely divided material from a source of supply to a zone of utilization with the aid of compressed air.

An object of the invention is to provide an improved mixing and conveying system which is simple and compact in construction, and which is moreover continuous, automatic and highly efficient in operation.

It has heretofore been proposed to provide mechanism for mixing granular materials such as cement, sand and/or graded aggregate and for pneumatically conveying the mixture at high velocity through a liquid flushed nozzle to a point of utilization in the form of concrete; and while these prior so-called cement guns have been relatively satisfactory for many purposes, their adaptations were limited because they either failed to accurately supply and thoroughly mix the concrete aggregate, or they did not deliver the mixture as a uniform stream and at sufficiently high velocity to the dispensing nozzle, or they were not adapted to effectively withstand the inherent wear for a sufficient period of time to insure continued and most economical operation. In order to provide for continuous and accurate feed of the granular ingredients it is desirable to provide means for automatically and continuously supplying relatively small premeasured successive batches of the cement and other granular material to a constantly advancing stream of conveying air, and to thoroughly mix the solid particles within the pneumatic stream. In order to insure delivery of the concrete mixture from the gun at sufficiently high velocity, it is necessary to utilize high pressure air, and to prevent both escape or leakage of excessive quantities of the air and undesirable obstruction to the stream flow. In order to insure most effective and economical operation of such a system it is also desirable to provide an assemblage of parts which will resist the wear so as to avoid undue delay in making repairs. All of these requirements must be met if most efficient operation under various working conditions, is to be obtained.

It is therefore a more specific object of my present invention to provide a new and useful pneumatic feeding and transporting assemblage especially adapted for use in connection with a concrete spray gun, which substantially eliminates the defects of prior apparatus and systems of this general type.

Another object of the present invention is to provide various improvements in the details of construction of apparatus for feeding and conveying pulverulent and granular substances with the aid of high pressure gas such as air, whereby the life of such apparatus is prolonged and the efficiency thereof is enhanced to a maximum.

A further object of the invention is to provide an improved pneumatic spray gun system wherein the granular aggregate is automatically accurately measured, thoroughly mixed, and continuously delivered at high velocity and with least obstruction to a zone of utilization.

Still another specific object of this invention is to provide compact and durable mechanism for continuously feeding and mixing successive premeasured batches of finely divided material and for transporting the mixture along a definite path in the presence of jets or currents of high pressure air.

An additional specific object of my invention is to provide an improved spray gun assemblage which can be manufactured and operated at moderate cost, which is flexible in its adaptations, and which is moreover highly efficient in actual use.

These and other objects and advantages of the present invention will be apparent from the following detailed description.

A clear conception of the several features constituting the present improvement, and of the mode of constructing and of operating a concrete spray gun system embodying the invention, may be had by referring to the drawings accompanying and forming a part of this specification wherein like reference characters designate the same or similar parts in the various views.

Fig. 1 is a perspective view of one of the improved spray gun units mounted upon a transporting truck, and showing a fragment of the propelling engine;

Fig. 2 is an enlarged fragmentary vertical section taken centrally and longitudinally through the screw conveyor and discharge nozzle, and centrally through one of the feeding and measuring pockets of the improved system;

Fig. 3 is a transverse vertical section through the conveyor discharge nozzle of Fig. 2, taken along the line 3—3;

Fig. 4 is a central longitudinal vertical section through an interchangeable type of final delivery section for the conveyor discharge nozzle, adapted for co-operation with a larger delivery hose;

Figures 5, 6:
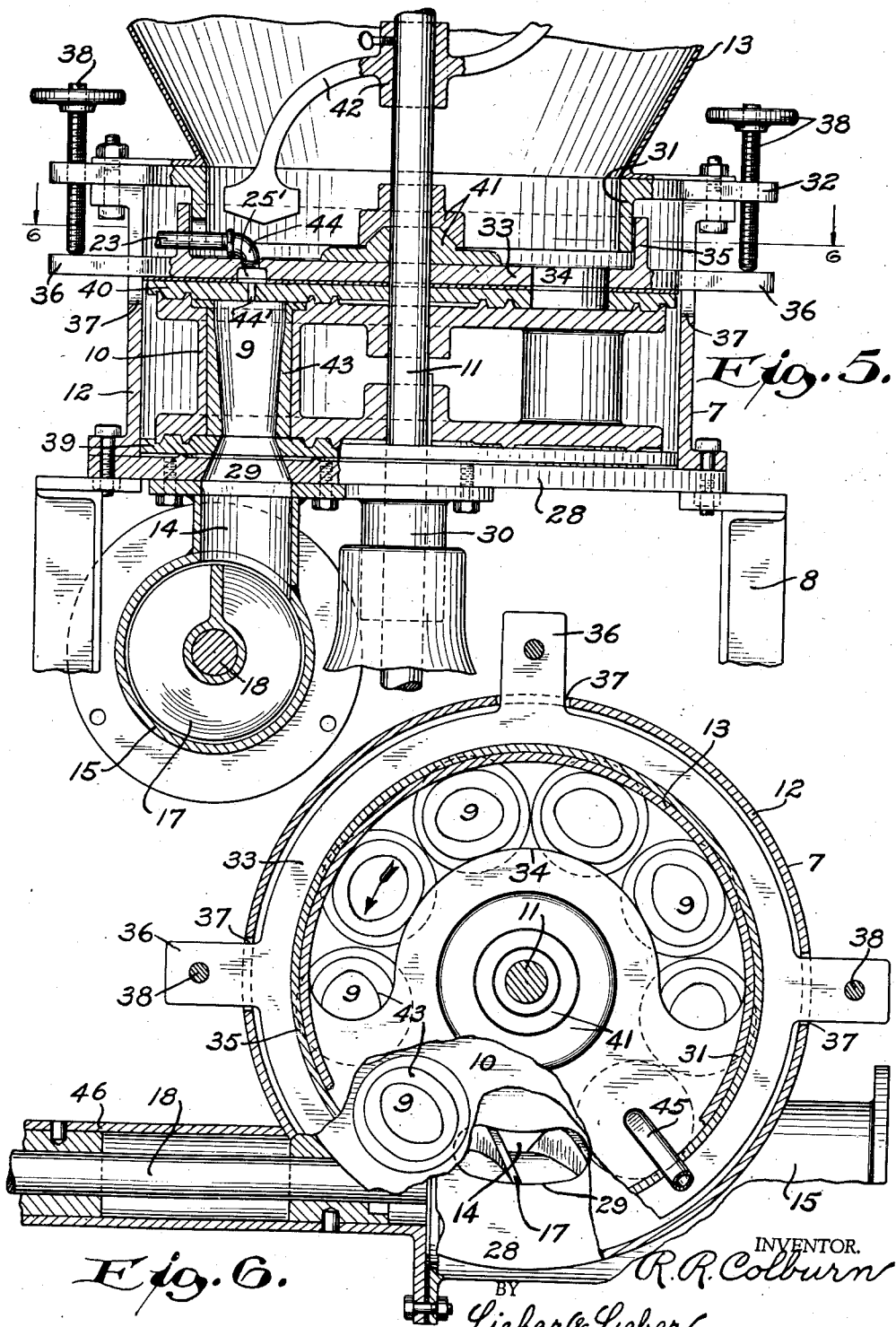
Fig. 5 is a central vertical section through the measuring and feeding pocket assemblage, taken at a right angle relative to the axis of the screw conveyor.
Fig. 6 is a transverse horizontal section through the measuring and feeding mechanism, taken along the line 6—6 of Fig. 5, and having some of the lower structure broken away to reveal certain details of construction.

While the invention has been shown and described herein as being embodied in a concrete spray gun system mounted for transportation upon a truck and operable by means of an internal combustion engine also associated with the transporting vehicle, it is not my intention to thereby unnecessarily limit the scope or utility of the improved features.

Referring to the drawings, the improved concrete spray gun assemblage shown therein, comprises in general a portable truck having a wheel supported frame 8; a granular material batch measuring and feeding unit 7 mounted centrally upon the rear portion of the frame 8 and having an annular series of upright open ended pockets 9 formed in a rotor 10 rotated by a vertical shaft 11, and confined within a fixed casing 12 between an upper supply hopper 13 and a lower discharge conduit 14; a screw conveyor unit mounted upon the frame 8 beneath the feed unit and having an elongated tubular horizontal casing 15 one end of which is in open communication with the lower end of the conduit 14 while the opposite end thereof communicates with a tapered discharge nozzle 16, and being provided with a helical conveyor screw 17 supported for rotation within the casing 15 by a shaft 18; a power unit or engine 19 drivingly connected to both of the shafts 11, 18 so as to simultaneously rotate the rotor 10 and the conveyor screw 17 at appropriate speeds; a mixture conducting hose 20 of selected size having one end detachably connected to the outlet end of the nozzle 16 by means of a coupling 21, and having a concrete spray nozzle 22 secured to its opposite end; a high pressure air supply line 23 communicating with the system past a control valve 24 and a pressure gauge 25; and a water supply line 26 communicating with the spray nozzle 22 past a control valve 27.

The transporting vehicle which carries the measuring and feeding unit, the screw conveyor unit, and the engine power unit 19, may be of any suitable and sufficiently durable construction; and the improved granular material feeding unit may be rigidly but detachably secured to the truck frame 8 in any desired manner, while the casing 15 of the screw conveyor may likewise be detachably suspended from the casing 12 of the pocket feeder. As shown, the annular casing 12 is mounted upon a fixed lower base plate 28 having therein an opening 29 communicating with the feeder discharge conduit 14, and the conduit 14 and tubular casing 15 are suspended directly from this plate while the vertical shaft 11 is journalled in a central bearing 30 also secured to the plate 28. The granular material supply hopper 13 is mounted upon an annular support or apron ring 31 which is fixedly but detachably secured to the top of the casing 12, and is provided with four radiating lugs 32. The hopper 13 is also provided with a vertically adjustable bottom plate 33 which has an arcuate granular material discharge opening 34 therein disposed above and in the path of travel of the pockets 9 but out of vertical alinement with the opening 29 in the lower plate 28; and this bottom plate 33 is provided with an annular upstanding ridge 35 which snugly embraces the lower end of the apron ring 31, and has a plurality of radial arms 36 which pass through vertical slots 37 in the annular outer casing 12 and are disposed beneath the lugs 32 of the fixed apron ring 31. Manually operable clamping screws 38 which have screw thread coaction with the lugs 32 of the stationary apron ring 31, are manipulable to force the hopper bottom plate 33 downwardly, in order to hold the rotor 10 down and to seal the upper and lower ends of the pockets 9; and in order to enhance this sealing effect, a lower sealing disk 39 is inserted between the fixed lower plate 28 and the rotor bottom, and a similar sealing disk 40 is introduced between the hopper bottom plate 33 and the top of the rotor 10. The sealing disks 39, 40 may be formed of any material which will insure proper sealing of the rotor pockets 9 and which will also resist wear, and these disks 39, 40 are secured to the plates 28, 33 respectively and are provided with openings which register with the openings 29, 34 as shown in Fig. 5.

As previously indicated, the rotor 10 is drivingly connected by means of a spline to the vertical shaft 11 which is journalled for rotation in the bearing 30 and is adapted to be driven by the engine 19 through suitable gearing, not shown; and the upper portion of the shaft 11 extends upwardly through the hopper bottom plate 33 and through a sealing assemblage 41 into the hopper 13, and is provided with a removable agitating rotor 42 which is adapted to prevent bridging of the granular material across the tapered hopper. Each of the revolving rotor pockets 9 may be formed within an upwardly removable liner 43 snugly fitting an adjacent bore in the rotor 10, and each pocket 9 may be provided with an upper approximately circular inlet opening and with a lower approximately elliptical discharge opening of smaller area than the upper opening, and the interior of each measuring pocket may be tapered from its larger to its smaller open end as illustrated in Figs. 2 and 5. The pockets 9 are located closely adjacent to each other and the granular material supply and delivery openings 34, 29 are of such length measured along the circular path of travel of the pockets 9, that the upper opening 34 will always communicate with about one half of the total number of pockets, whereas the lower elongated opening 29 is adapted to communicate in rapid succession with the successive advancing pockets 9, in order to insure substantially constant and uniform delivery of granular material from the hopper 13 to the screw conveyor casing 15 through the conduit 14 when the rotor 10 is revolving. The openings 34, 29 are however off-set or staggered vertically to such an extent that the opposite ends of the opening 34 will always be spaced from the corresponding opposite sides or ends of the opening 29, by at least the width of one and one-half pockets 9, in order to prevent open communication between the hopper 13 and conduit 14 at all times, and to insure effective sealing of the screw conveyor from the ambient atmosphere.

The high pressure air supply line 23 is communicable past the control valve 24 and gauge 25 with an air injection element such as an elbow 44 the outlet end of which communicates with an elongated chamber 25' having a series of air delivery ports 44' directed downwardly above the pocket outlet opening 29 and conduit 14 as shown in Figs. 2 and 5, so that when each pocket 9 is brought into communication with the conduit 14 the batch of granular material therein will be forcibly ejected therefrom by the jets of high pressure air delivered from the ports 44'. When the successive empty pockets 9 are advanced beyond the discharge opening 29, they will still contain batches of high pressure air, and in order to release this air before the pockets are again brought into open communication with the upper feed opening 34, a vent pipe 45 is provided as shown in Figs. 2 and 6, this pipe being openly communicable with the open upper end of each pocket 9 midway between the corresponding ends of the openings 29, 34. The granular material supply and feeding unit is preferably constructed, so that the successive superimposed elements thereof, namely, the hopper 13, apron ring 31, bottom plate 33, sealing disk 40, rotor 10, sealing disk 39, supporting plate 28, and casing 12 may be freely vertically removed in succession, upon release of the clamping bolts which normally hold these parts assembled, and the hand screws 38 may be readily adjusted at will to vary the sealing pressure on the rotor 10.

The improved screw conveyor and ejector nozzle unit is adapted to thoroughly mix and to constantly feed the granular aggregate which is deposited therein from the succesive revolving pockets 9 through the conduit 14, and the interior of the tubular casing 15 is constantly filled with air at relatively high pressure when the machine is operating, so that the interior of this conveyor casing must be effectively sealed. The horizontal shaft 18 upon which the conveyor screw 17 is mounted, is preferably journalled in a long bearing 46 which should be sealed against air leakage, and is drivingly connected to the propelling motor or engine 19 through suitable speed control mechanism, and the helical conveyor screw 17 co-operates with the interior of the casing 15 with minimum clearance and may extend into the nozzle section 47 and have increasing pitch and decreasing diameter toward its discharge end as shown in Fig. 2, so as to augment the speed of travel of the material in the direction of advancement thereof. By virtue of the fact that the conveyor screw 17 and its supporting shaft 18 are mounted in a single bearing 46 located at the receiving end of the conveyor, the path of travel of the granular material and high pressure air along the interior of the casing 15 will obviously be unobstructed by parts other than the conveyor flights, and the latter will function to additionally mix the granular aggregate while it is being advanced toward the tapered discharge nozzle 16.

The improved discharge nozzle 16 is gradually tapered throughout its entire length, and is preferably formed of a series of interconnected sections 47, 48, 49 having progressively diminishing internal cross-sectional area, see Figs. 1 to 4 inclusive. In order to convert this nozzle 16 into a Venturi tube adapted to materially increase the velocity of the mixture of granular material and air flowing therethrough with the aid of high pressure air, each of the nozzle sections is provided with an annular series of high pressure air injection ports 50 all of which are directed forwardly and inwardly toward the central nozzle axis, and these air injection ports 50 are preferably staggered in the several sections and all communicate with the high pressure air supply line 23 through a pipe 51 and a series of air distribution pipes 52 which may be provided with plugs 53 for effecting drainage of moisture, see Fig. 1. The sectional construction of the fixed nozzle 16 facilitates manufacture thereof and also permits interchangeable use of final discharge sections 49, 49' of different sizes or internal diameters as shown in Figs. 2 and 4, and in order to permit accurate and convenient formation of the ports 50 by drilling, each nozzle section 47, 48, 49 may be provided with an annular normally concealed recess 54 the lowermost portion of each of which communicates with one of the air supply pipes 52. The ports 50 may also be inclined so as to produce whirling of the mass passing through the nozzle 16, and the delivery end of the conveyor screw 17 extends into the larger nozzle section 47; and in order to prevent material from lodging and packing within the section 48, a revolving scraper 55 having radiating blades 56 coacting with the interior of the nozzle beyond the end of the screw 17, may be provided, as depicted in Figs. 2 and 3. The final nozzle section 49 may also be rubber lined, and the several sections 47, 48, 49 of the delivery nozzle 16 may be firmly but detachably interconnected to seal the recesses 54 by bolts 57, which also permit ready interchanging of the final sections 49, and the granular material and air mixture dispensing hose 20 may be firmly connected to the delivery end of the fixed nozzle 16 by a coupling 21 of any suitable type.

The flexible hose 20 which is ordinarily rubber lined, may be of any selected size and length, and the final spray nozzle 22 may be of any suitable type. When this nozzle 22 is especially intended for use in converting the granular aggregate which is delivered by the feed mechanism, into concrete spray, then the nozzle should be equipped with water supply means such as the auxiliary flexible hose 26 and control valve 27. With the aid of this hose 26 and valve 27, regulated quantities of water may be injected into and mixed with the relatively dry granular aggregate delivered into the nozzle 22 from the hose 20, and the mixture will leave the nozzle 22 in the form of homogeneous concrete spray which may be utilized for various purposes.

While the normal operation and use of the improved apparatus should be apparent from the foregoing detailed description of the construction of the various parts, a short résumé of this operation will be given. When the equipment has been properly assembled as shown in Fig. 1, the hopper 13 should be supplied with proper quantities of the mixture of cement and sand or aggregate, whereupon the propelling engine 19 may be placed in operation and drivingly connected to the shafts 11, 18 with the aid of the usual clutch mechanism. The batch measuring and feeding rotor 10 will then be revolved in an anti-clockwise direction as viewed in Fig. 6, and the conveyor screw 17 will be simultaneously rotated. As the successive batch measuring pockets 9 pass beneath the feed inlet opening 34 of the hopper bottom 33, they will be filled by gravity and will produce pre-measured batches of granular material descending from the hopper 13, and the granular material will be prevented from bridging in this hopper by the agitator rotor 42. Upon being filled with granular material, each of the successive pockets 9 will be carried through a sealing zone and will thereafter be brought into alinement with the opening 29 in the supporting plate 28 and with the conduit 14. Air under pressure will then be injected into the successive pockets 9 from the supply line 23 through the chamber 25' and ports 44', and the granular material will be quickly ejected from each pocket 9 at high velocity and into the path of the conveyor screw 17. As the pockets 9 are carried beyond the opening 29 they are again sealed, and will be vented through the pipe 45', and the vented pockets 9 will then proceed to be refilled by fresh batches of granular material from the hopper 13. The successive batches of granular material which are delivered in rapid succession into the conveyor casing 15, are carried forwardly through this casing both by the high pressure air flowing therethrough and by the conveyor screw 17, and the batches of granular material are thus blended into a continuous stream. The mixture is delivered in the form of a constant stream into the larger end of the tapered nozzle 16 where it is subjected to additional high pressure air emanating from the ports 50 and is simultaneously whirled and has its velocity greatly augmented both by these additional air jets and by virtue of the tapered internal construction of the nozzle 16. After leaving the smaller end of the nozzle 16, the thoroughly mixed granular material is advanced at high velocity through the hose 20 and is ultimately discharged into the supply nozzle 22. Here the relatively dry granular material is mixed with water and the wetted concrete thus formed is quickly discharged in the form of a spray from the delivery end of the nozzle 22. In this manner relatively dry concrete aggregate can be quickly converted into fluent concrete mixture and delivered to any place of utilization with the aid of the nozzle 22, and the quantities of air and water admitted to the system can readily be controlled by manipulating the valves 24, 27.

The manually operable screws 38 may be readily adjusted so as to properly seal the rotor 10 against undesirable escape of high pressure air, and the sealing disks 39, 40 should be formed to minimize the wear and to affect thorough sealing of the rotor. The interchangeable sections 49, 49' may be used to facilitate the use of hoses 20 of different diameters, for performing different classes of work, and all parts of the apparatus are readily accessible for convenient inspection and repair.

From the foregoing detailed description it will be apparent that the present invention provides an improved pneumatic conveyor system for granular materials or the like, which is simple and durable in construction, conveniently manipulable, and which is extremely flexible in operation. The improved construction of the feeding and conveying units, is such that all parts are readily accessible for adjustment and inspection, and also permits convenient manufacture of the several parts. The pocket liners 43 and the sealing disks 39, 40 which may be subject to considerable wear, are quickly replaced thereby entailing minimum loss of time in making replacements of parts, and the improved construction of the Venturi nozzle 16 makes it possible to readily manufacture these nozzles and to interchange the sections thereof. The improved assemblage has proven highly satisfactory and economical in actual use, and the various parts thereof can obviously be constructed and assembled at moderate cost.

It should be understood that it is not desired to limit this invention to the exact details of construction or to the precise mode of use, herein shown and described, for various modifications within the scope of the appended claims may occur to persons skilled in the art.

I claim:

1. In combination, a granular material supply, a granular material conducting casing spaced from said supply, a rotary carrier having an annular series of pockets revolvable about an axis between said supply and said casing, opposite supply and outlet end sealing plates coacting with said carrier and having openings therein communicating with said supply and casing respectively, the openings in said plates being out of alinement and so formed and disposed that the opposite ends of some pockets advancing from one opening toward the other will always be sealed, means for admitting air under pressure to the supply ends of said pockets when in communication with the opening in said outlet end plate, and means for venting the successive pockets only while travelling from the opening in said outlet end plate toward the opening in said supply end plate and when the pockets have been sealed from both of said openings.

2. In combination, a granular material supply having a granular material feed opening, a carrier having a series of pockets revolvable adjacent to said supply to periodically expose the successive pockets to said opening, means for injecting air under pressure into said pockets to eject granular material therefrom after the pockets have been sealed from said supply, and means for venting the successive pockets only after said ejection of the granular material and before the pockets are again brought into communication with said opening.

3. In combination, means forming a tubular casing having a discharge orifice at one end thereof, a screw conveyor extending toward said orifice and being rotatable within said casing, means for depositing batches of granular material downwardly into said casing, a granular material delivery hose directed axially away from said orifice, and a Venturi nozzle interposed between said orifice and said hose and having a plurality of forwardly directed air injection ports therein, said nozzle being formed of several adjoining successive sections forming a longitudinally smooth and gradually tapered passage and each having an annular end groove communicating with several of said air injection ports and adapted to be sealed by an adjacent section.

4. In combination, means forming a tubular casing having one end provided with a discharge orifice, a screw conveyor extending along and being rotatable within said casing, means for depositing batches of granular material downwardly into said casing remote from said orifice, a granular material delivery hose directed axially away from said orifice, a Venturi nozzle interposed between said orifice and said hose and having a plurality of forwardly directed air injection ports therein, said nozzle being formed of several adjusting successive sections forming a longitudinally smooth and gradually tapered passage and each having an annular end groove communicating with several of said air injection ports and adapted to be sealed by an adjacent section, and means for effecting removal of liquid downwardly from within said grooves.

5. In combination, an annular casing having a vertical central axis and a series of upwardly open slots disposed parallel to said axis, a carrier rotatable within said casing and having a series of upwardly and downwardly open measuring pockets revolvable about said axis, a fixed bottom plate coacting with the lower portion of said rotor to seal the lower ends of said pockets and having a discharge opening therein, a top plate coacting with the upper portion of said rotor to seal the upper ends of said pockets and having a supply opening therein disposed out of vertical alinement with said discharge opening, said top plate having peripheral lugs slidable within said casing slots to prevent rotation of said plate while permitting vertical displacement thereof, and adjustable means coacting with said lugs outside of said casing for urging said top plate against said carrier and toward said bottom plate.

6. In combination, an annular casing having a vertical central axis and a series of upwardly open slots disposed parallel to said axis, a carrier rotatable within said casing and having a series of upwardly and downwardly open measuring pockets revolvable about said axis, a fixed bottom plate coacting with the lower portion of said rotor to seal the lower ends of said pockets and having a discharge opening therein, a top plate coacting with the upper portion of said rotor to seal the upper ends of said pockets and having a supply opening therein disposed out of vertical alinement with said discharge opening, said top plate having peripheral lugs slidable within said casing slots to prevent rotation of said plate while permitting vertical displacement thereof, a hopper secured to the upper portion of said casing, and adjustable means coacting with said hopper and with said lugs outside of said casing for urging said top plate against said carrier and toward said bottom plate.

7. In combination, an annular casing having a vertical central axis and a series of upwardly open slots disposed parallel to said axis, a carrier rotatable within said casing and having a series of upwardly and downwardly open measuring pockets revolvable about said axis, a fixed bottom plate coacting with the lower portion of said rotor to seal the lower ends of said pockets and having a discharge opening therein, a top plate coacting with the upper portion of said rotor to seal the upper ends of said pockets and having a supply opening therein disposed out of vertical alinement with said discharge opening, said top plate having peripheral lugs slidable within said casing slots to prevent rotation of said plate while permitting vertical displacement thereof, a hopper detachably secured to the upper portion of said casing and normally closing the upper ends of said slots, and adjustable means coacting with said hopper and with said lugs for urging said top plate against said carrier, said plates and said carrier being freely vertically removable from said casing upon removal of said hopper.

8. In combination, an annular casing having a vertical central axis and a series of upwardly open slots disposed parallel to said axis, a carrier rotatable within said casing and having a series of upwardly and downwardly open measuring pockets revolvable about said axis, each of said pockets having an upwardly removable liner therein, a fixed bottom plate coacting with the lower portion of said rotor to seal the lower ends of said pockets and having a discharge opening therein, a top plate coacting with the upper portions of said rotor and liners to seal the upper ends of said pockets and having a supply opening therein disposed out of vertical alinement with said discharge opening, said top plate having peripheral lugs slidable within said casing slots to prevent rotation of said plate while permitting vertical displacement thereof, a hopper detachably secured to the upper portion of said casing and normally closing the upper ends of said slots, and adjustable means coacting with said hopper and with said lugs for urging said top plate against said carrier, said plates, said liners and said carrier being freely vertically removable from said casing upon removal of said hopper.

9. In combination, an annular casing having a material supply hopper provided with a feed opening, a carrier having a series of pockets revolvable to periodically expose the same to said hopper through said opening, means for injecting fluid under pressure into said pockets to eject material therefrom after the pockets have received charges of said material from said hopper and have been sealed from said opening, and means for venting the successive pockets only after said ejection of material and before the pockets are again brought into communication with said hopper.

10. In combination, means forming a tubular casing having a discharge orifice at one end, a screw conveyor rotatable within said casing, means for depositing granular material into said casing remote from said orifice, a granular material delivery hose directed axially away from said orifice, and a nozzle interposed between said orifice and said hose and having a series of forwardly directed air injection ports therein, said nozzle being formed of several adjoining sections forming a longitudinally smooth and gradually tapered passage and each section having an annular air supply groove for said ports normally closed by an adjoining section.

11. In combination, means forming a tubular casing having a discharge orifice at one end, a screw conveyor rotatable within said casing, means for depositing granular material into said casing remote from said orifice, a granular material delivery hose directed axially away from said orifice, a nozzle interposed between said orifice and said hose and having a series of forwardly directed air injection ports therein, said nozzle being formed of several adjoining sections forming a longitudinally smooth and gradually tapered passage and each section having an annular air supply groove for said ports normally closed by an adjoining section, and means for admitting compressed air to the lowermost portions of said grooves.

12. In combination, means forming a tubular casing having a discharge orifice at one end, a screw conveyor rotatable within said casing, means for depositing granular material into said casing remote from said orifice, a granular material delivery hose directed axially away from said orifice, a Venturi nozzle interposed between said orifice and said hose and having a series of forwardly directed air injection ports therein, said conveyor having gradually increasing pitch approaching said nozzle and being of uniform diameter within said casing and tapered within said nozzle, and a scraper blade carried by the tapered end of said conveyor and coacting with the smaller tapered end of said nozzle adjacent to said hose.

RICHARD R. COLBURN.